US012306748B2

(12) United States Patent
Kim et al.

(10) Patent No.: US 12,306,748 B2
(45) Date of Patent: May 20, 2025

(54) METHODS, DEVICES, AND SYSTEMS FOR ALLOCATING MEMORY SPACE

(71) Applicant: Samsung Electronics Co., Ltd., Suwon-si (KR)

(72) Inventors: Kyungsan Kim, Suwon-si (KR); Wonjae Lee, Suwon-si (KR); Junhyeok Im, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 116 days.

(21) Appl. No.: 18/125,218

(22) Filed: Mar. 23, 2023

(65) Prior Publication Data
US 2024/0143498 A1    May 2, 2024

(30) Foreign Application Priority Data

Oct. 27, 2022    (KR) .................. 10-2022-0140508

(51) Int. Cl.
*G06F 12/02*    (2006.01)

(52) U.S. Cl.
CPC .... *G06F 12/023* (2013.01); *G06F 2212/1016* (2013.01); *G06F 2212/1041* (2013.01); *G06F 2212/1048* (2013.01)

(58) Field of Classification Search
CPC ............... G06F 12/023; G06F 12/0646; G06F 2212/1016; G06F 2212/1041; G06F 2212/1048

(Continued)

(56) References Cited

U.S. PATENT DOCUMENTS 6,070,202 A  *  5/2000  Minkoff ............... G06F 9/5016
                                                          713/1
8,806,158 B2     8/2014  Iyengar
                (Continued)

FOREIGN PATENT DOCUMENTS

CN      107402894 A      11/2017
CN      110597606 A      12/2019
                (Continued)

OTHER PUBLICATIONS

"Introducing Project Capitola: Software Defined Memory for Data Centric Workloads, vSphere Team, Oct. 5, 2021, https://blogs.vmware.com/vsphere/2021/10/introducing-project-capitola.html".

(Continued)

*Primary Examiner* — Reginald G Bragdon
*Assistant Examiner* — Aaron D Ho
(74) *Attorney, Agent, or Firm* — Myers Bigel, P.A.

(57) ABSTRACT

A method of allocating a memory space is provided. The method includes generating a plurality of arena pools by logically grouping a plurality of memories based on a physical characteristic of each of the memories, the plurality of memories including a first memory and a second memory that is different from the first memory, generating a memory use-case with respect to at least one arena included in the plurality of arena pools, based on a memory allocation request, and returning a memory space corresponding to the memory allocation request, based on the memory use-case, wherein the at least one arena comprises a logical unit that is configured to manage a memory space corresponding to at least one memory from the plurality of memories grouped according to the physical characteristic, and each of the plurality of arena pools comprises a group of arenas.

18 Claims, 14 Drawing Sheets

(58) Field of Classification Search
USPC .......................................................... 711/105
See application file for complete search history.

(56) References Cited

U.S. PATENT DOCUMENTS

| | | | |
|---|---|---|---|
| 9,224,452 B2 | 12/2015 | Dong et al. | |
| 9,928,109 B2 | 3/2018 | Durant | |
| 9,938,209 B2 | 4/2018 | Chaki et al. | |
| 10,318,174 B2 | 6/2019 | Kim et al. | |
| 11,379,302 B2 | 7/2022 | Kim | |
| 11,537,573 B2* | 12/2022 | Ghanbari | G06F 16/1748 |
| 2005/0268063 A1* | 12/2005 | Diao | G06F 9/5083 |
| | | | 711/170 |
| 2005/0278381 A1* | 12/2005 | Diao | G06F 9/5016 |
| 2007/0168634 A1* | 7/2007 | Morishita | G06F 3/0665 |
| | | | 711/170 |
| 2010/0111309 A1* | 5/2010 | Khatri | G06F 21/575 |
| | | | 726/16 |
| 2011/0276742 A1* | 11/2011 | Anand | G06F 9/5077 |
| | | | 718/1 |
| 2015/0134709 A1* | 5/2015 | Lee | G06F 16/2237 |
| | | | 707/812 |
| 2016/0055097 A1* | 2/2016 | Ki | G06F 12/0871 |
| | | | 711/160 |
| 2016/0378355 A1* | 12/2016 | Muthukkaruppan | |
| | | | G06F 3/0664 |
| | | | 711/136 |
| 2017/0185351 A1* | 6/2017 | Guim Bernat | G06F 12/02 |
| 2019/0042408 A1* | 2/2019 | Schmisseur | H04L 41/0668 |
| 2020/0210331 A1* | 7/2020 | Muchherla | G06F 3/064 |
| 2020/0233593 A1* | 7/2020 | Zhao | G06F 3/0607 |
| 2020/0278825 A1* | 9/2020 | Wolf | G06F 12/023 |
| 2021/0374056 A1 | 12/2021 | Malladi et al. | |
| 2022/0050722 A1* | 2/2022 | Dugast | G06F 9/5016 |
| 2022/0058041 A1* | 2/2022 | Nair | G06F 9/45558 |
| 2022/0066827 A1 | 3/2022 | Tavallaei et al. | |
| 2022/0083405 A1* | 3/2022 | Masputra | G06F 21/53 |
| 2022/0147470 A1* | 5/2022 | Lee | G06F 13/4022 |
| 2022/0164286 A1 | 5/2022 | Jeong et al. | |
| 2022/0164462 A1* | 5/2022 | BenHanokh | H04L 9/0833 |
| 2022/0222010 A1* | 7/2022 | Bachmutsky | G06F 3/0655 |
| 2022/0222118 A1 | 7/2022 | Wang et al. | |
| 2022/0229777 A1* | 7/2022 | Shveidel | G06F 3/067 |
| 2022/0317925 A1* | 10/2022 | Lepak | G06F 3/0679 |
| 2023/0367492 A1* | 11/2023 | Gupta | G06F 3/0611 |

FOREIGN PATENT DOCUMENTS

| | | |
|---|---|---|
| KR | 20210024311 A | 3/2021 |
| KR | 20210147976 A | 12/2021 |
| KR | 20220070951 A | 5/2022 |
| WO | 2006053084 A2 | 5/2006 |

OTHER PUBLICATIONS

"Kyungsan Kim, SMDK Architecture "Prior Publication of Invention" Mar. 23, 2022".

"MemVerge 2021 Corporate Brochure, https://memverge.com/wp-content/uploads/2021/02/Corporate-Profile_2021.pdf".

Bowman, Kurtis , "Gen-Z Communication at the Speed of Memory," OCP Summit, 2018 Storage Developer Conference, Santa Clara CA Sep. 24-Feb. 27, 2018, www.storagedeveloper.org.

Liquid API SW Stack (Application Programming Interface) Website, https://api.liquid.com (Accessed on Jun. 27, 2022).

* cited by examiner

FIG. 10

| IMDB throughput (MB/s) | Application A | | Application B | |
|---|---|---|---|---|
| | Set | Get | Set | Get |
| UX1 (Lowcost) | x0.61 | x0.58 | x0.78 | x1.04 |
| UX2 (More memory) | x2.6 | N/A | x0.98 | N/A |
| UX3 (CXL > storage) | N/A | N/A | x253.3 | x14.1 |
| UX4 (Scale-up > Scale-out) | x4.05 | x5.45 | x5.8 | x36.2 |

METHODS, DEVICES, AND SYSTEMS FOR ALLOCATING MEMORY SPACE

CROSS-REFERENCE TO RELATED APPLICATION

This application is based on and claims priority under 35 U.S.C. § 119 to Korean Patent Application No. 10-2022-0140508, filed on Oct. 27, 2022, in the Korean Intellectual Property Office, the disclosure of which is incorporated by reference herein in its entirety.

BACKGROUND

The inventive concept relates to methods, devices, and systems for allocating a memory space.

Apparatuses configured to process data may perform various operations by accessing memory. For example, the apparatuses may process data read from memory and write processed data to memory. Because of the required performance and functions of systems, the systems may include various apparatuses that communicate with each other through a link providing a high bandwidth and low latency. Memory included in systems may be shared and accessed by at least two apparatuses. Accordingly, the performance of systems may depend not only on the operating speed of each apparatus but also on the communication efficiency between apparatuses and a time taken for memory access.

Technologies related to central processing units (CPUs) have evolved into multi-core and multi-socket applications, and accordingly, computing capacity required in a single system has increased.

SUMMARY

Aspects of the inventive concept provide methods, devices, and systems for allocating a memory space, by which heterogeneous memories are isolated from each other (e.g., latency fluctuation is prevented) and the same physical characteristics are aggregated (e.g., bandwidth aggregation is performed), by grouping the heterogeneous memories by their physical characteristics, such that memories having different physical characteristics are not mixedly used in a single logical memory area.

According to aspects of the inventive concept, there is provided a method of allocating a memory space that includes generating a plurality of arena pools by logically grouping a plurality of memories based on a physical characteristic of each of the plurality of memories, the plurality of memories including a first memory and a second memory that is different from the first memory, generating a memory use-case with respect to at least one arena included in the plurality of arena pools, based on a memory allocation request, and returning a memory space corresponding to the memory allocation request, based on the memory use-case, wherein the at least one arena comprises a logical unit that is configured to manage a memory space corresponding to at least one memory from the plurality of memories grouped according to the physical characteristic, and each of the plurality of arena pools comprises a group of arenas.

According to aspects of the inventive concept, there is provided a memory expander that includes at least one processor, and a memory that is configured to store instructions that, when executed by the at least one processor, causes the at least one processor to perform operations for allocating a memory space, the operations comprising generating a plurality of arena pools by logically grouping a plurality of memories based on a physical characteristic of each of the plurality of memories, the plurality of memories including a first memory and a second memory that is different from the first memory, generating a memory use-case with respect to at least one arena included in the plurality of arena pools, based on a memory allocation request, and returning a memory space corresponding to the memory allocation request, based on the memory use-case, wherein the at least one arena comprises a logical unit that is configured to manage a memory space corresponding to at least one memory from the plurality of memories grouped according to the physical characteristic, and each of the plurality of arena pools comprises a group of arenas.

According to aspects of the inventive concept, there is provided a system including a device connected to a bus and configured to communicate with a first memory, a host processor configured to select one of a first protocol or a second protocol based on a size of first data to be written to the first memory or read from the first memory, and access the first memory through the bus based on the one of the first protocol or the second protocol that was selected, and a second memory that is different from the first memory, wherein the first protocol is for memory access, the second protocol is for non-coherent input/output, and the host processor is further configured to generate a plurality of arena pools by logically grouping a plurality of memories based on a physical characteristic of each of the plurality of memories, the plurality of memories including the first memory and the second memory, generate a memory use-case with respect to at least one arena included in the plurality of arena pools, based on a memory allocation request, and return a memory space corresponding to the memory allocation request, based on the memory use-case, wherein the at least one arena comprises a logical unit that is configured to manage a memory space corresponding to at least one memory from the plurality of memories grouped according to the physical characteristic, and each of the plurality of arena pools comprises a group of arenas.

BRIEF DESCRIPTION OF THE DRAWINGS

Example embodiments will be more clearly understood from the following detailed description taken in conjunction with the accompanying drawings in which:

FIG. 10 illustrates the results of evaluating the performance of a method of allocating a memory space, according to some embodiments;

DETAILED DESCRIPTION

Hereinafter, example embodiments are described in detail with reference to the accompanying drawings. To increase computing capacity, there is a need to configure a system with heterogeneous memory arrays having different physical characteristics from each other.

Figure 1:
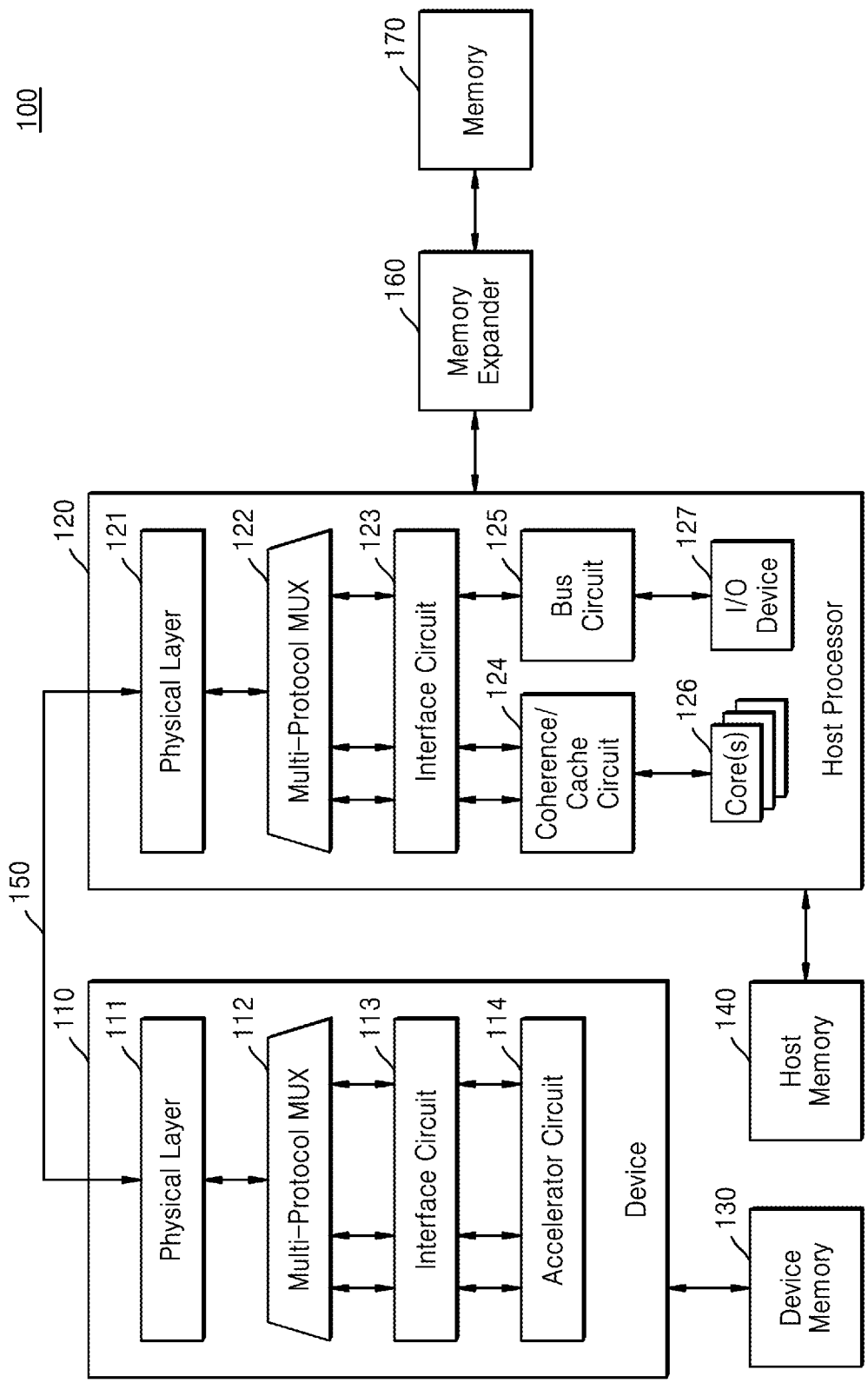
FIG. 1 is a block diagram of a system according to some embodiments.

FIG. 1 is a block diagram of a system 100 according to some embodiments.

Referring to FIG. 1, the system 100 may be a computing system (or a component of a computing system), which includes a device 110, a host processor 120, a memory expander 160, and a memory 170, which communicate with one another. For example, the system 100 may be included in a stationary computing system, such as a desktop computer, a server, or a kiosk, or a portable computing system, such as a laptop computer, a mobile phone, or a wearable device. In some embodiments, the system 100 may be included in a system-on-chip (SoC) or a system-in-package (SiP), in which the device 110, the host processor 120, and the memory expander 160 are implemented in a single chip or package. As shown in FIG. 1, the system 100 may include the device 110, the host processor 120, a device memory 130, a host memory 140, the memory expander 160, and the memory 170.

In some embodiments, the device memory 130 may have a different physical characteristic than the memory 170. At this time, the memory expander 160 may be connected to heterogeneous memories including the device memory 130 and the memory 170 and may optimally allocate the memories in response to a memory allocation request. For example, the device memory 130 may include compute express link (CXL) dynamic random access memory (DRAM), and the memory 170 may include double data rate (DDR) memory.

Referring to FIG. 1, the device 110 and the host processor 120 may communicate with each other through a link 150 and may exchange messages and/or data with each other through the link 150. Although some embodiments are described below referring to the link 150 based on CXL specifications supporting CXL protocols, the present disclosure is not limited thereto and the device 110 and the host processor 120 may communicate with each other based on coherent interconnect technologies, for example, an XBus protocol, an NVLink protocol, Infinity Fabric protocol, a cache coherent interconnect for accelerators (CCIX) protocol, and a coherent accelerator processor interface (CAPI) protocol.

In some embodiments, the link 150 may support multiple protocols, and messages and/or data may be transmitted therethrough according to the multiple protocols. For example, the link 150 may support CXL protocols including a non-coherent protocol (e.g., CXL.io), a coherent protocol (e.g., CXL.cache), and a memory access protocol (or a memory protocol, e.g., CXL.mem). In some embodiments, the link 150 may support protocols, for example, a peripheral component interconnect (PCI) protocol, a PCI express (PCIe) protocol, a universal serial bus (USB) protocol, and a serial advanced technology attachment (SATA) protocol. Here, a protocol supported by the link 150 may be referred to as an interconnect protocol.

The device 110 may refer to any device that provides a useful function for the host processor 120. In some embodiments, the device 110 may correspond to an accelerator based on CXL specifications. For example, software run on the host processor 120 may offload at least part of computing and/or input/output (I/O) operation onto the device 110. In some embodiments, the device 110 may include at least one selected from the group consisting of a programmable component, such as a graphics processing unit (GPU) or a neural processing unit (NPU), a component, such as an intellectual property (IP) core, which provides a fixed function, or a reconfigurable component, such as a field programmable gate array (FPGA). As shown in FIG. 1, the device 110 may include a physical layer 111, a multi-protocol multiplexer (MUX) 112, an interface circuit 113, and an accelerator circuit 114 and may communicate with the device memory 130.

The accelerator circuit 114 may perform a useful function, which the device 110 provides for the host processor 120, and may be referred to as an accelerator logic. As shown in FIG. 1, the accelerator circuit 114 may communicate with the host processor 120 through the interface circuit 113 by using multiple protocols.

The interface circuit 113 may determine one of the multiple protocols, based on a message and/or data used for the communication between the accelerator circuit 114 and the host processor 120. The interface circuit 113 may be connected to at least one protocol queue included in the multi-protocol MUX 112 and may exchange messages and/or data with the host processor 120 through the protocol queue. In some embodiments, the interface circuit 113 and the multi-protocol MUX 112 may be integrated into a single component.

In some embodiments, the multi-protocol MUX 112 may include multiple protocol queues respectively corresponding to multiple protocols supported by the link 150. In some embodiments, the multi-protocol MUX 112 may arbitrate communications using different protocols and provide selected communications to the physical layer 111. In some embodiments, the physical layer 111 may be connected to a physical layer 121 of the host processor 120 through a single interconnect, a bus, a trace, or the like.

As shown in FIG. 1, the device memory 130 may be connected to the device 110 and may be referred to as a device-attached memory. When the device memory 130 is included in the system 100, as shown in FIG. 1, the accelerator circuit 114 may communicate with the device memory 130 based on a protocol, i.e., a device-specific protocol, which is independent of the link 150.

In some embodiments, the device 110 may include a memory interface as a component for accessing the device memory 130, and the accelerator circuit 114 and/or the interface circuit 113 may access the device memory 130 through the memory interface. The memory interface may provide not only access to the device memory 130 for the device 110, i.e., the accelerator circuit 114, but also access to the device memory 130 through the link 150 and the interface circuit 113 for the host processor 120.

In some embodiments, the device 110 may include a controller as a component for accessing the device memory 130, and the accelerator circuit 114 may access the device memory 130 through the controller. The controller may provide not only access to the device memory 130 for the device 110, i.e., the accelerator circuit 114, but also access to the device memory 130 through the link 150 for the host processor 120.

In some embodiments, the device memory 130 may correspond to a device-attached memory based on CXL specifications.

The host processor 120 may correspond to a main processor, e.g., a central processing unit (CPU), of the system 100. In some embodiments, the host processor 120 may correspond to a host based on CXL specifications. As shown in FIG. 1, the host processor 120 may be connected to the host memory 140 and the memory expander 160 and may include a physical layer 121, a multi-protocol MUX 122, an interface circuit 123, a coherence/cache circuit 124, a bus circuit 125, at least one core 126, and an I/O device 127.

The at least one core 126 may execute instructions and may be connected to the coherence/cache circuit 124. The coherence/cache circuit 124 may include a cache hierarchy and may be referred to as a coherence/cache logic. As shown in FIG. 1, the coherence/cache circuit 124 may communicate with the at least one core 126 and the interface circuit 123. For example, the coherence/cache circuit 124 may enable communication using at least two protocols including a coherent protocol and a memory access protocol. In some embodiments, the coherence/cache circuit 124 may include a direct memory access (DMA) circuit. The I/O device 127 may be used to communicate with the bus circuit 125. For example, the bus circuit 125 may correspond to a PCIe logic, and the I/O device 127 may correspond to a PCIe I/O device.

The interface circuit 123 may enable components, e.g., the coherence/cache circuit 124 and the bus circuit 125, of the host processor 120 to communicate with the device 110. In some embodiments, the interface circuit 123 may enable components of the host processor 120 to exchange messages and/or data with the device 110 according to multiple protocols, e.g., a non-coherent protocol, a coherent protocol, and a memory protocol. In some embodiments, the host processor 120 may be configured to select one of a first protocol or a second protocol based on a size of data to be written to the device memory 130 or read from the device memory 130, and may be configured to access the device memory 130 through a bus (or the link 150) based on the selected one of the first protocol or the second protocol. In some embodiments, the first protocol may be for memory access (e.g., a memory protocol), and the second protocol may be for non-coherent input/output (e.g., a non-coherent protocol). The device memory 130 may be different from the memory 170.

The multi-protocol MUX 122 may include at least one protocol queue. The interface circuit 123 may be connected to at least one protocol queue included in the multi-protocol MUX 122 and may exchange messages and/or data with the device 110 through the protocol queue.

In some embodiments, the multi-protocol MUX 122 may determine one of the multiple protocols, based on a message and/or data used for the communication between components of the host processor 120 and the device 110.

In some embodiments, the interface circuit 123 and the multi-protocol MUX 122 may be integrated into a single component. In some embodiments, the multi-protocol MUX 122 may include multiple protocol queues respectively corresponding to multiple protocols supported by the link 150. In some embodiments, the multi-protocol MUX 122 may arbitrate communications using different protocols and provide selected communications to the physical layer 121.

The memory expander 160 may be connected to heterogeneous memories including the device memory 130 and the memory 170 and may optimally allocate a memory space in response to a memory allocation request.

A method of optimally allocating, performed by the memory expander 160 connected to heterogeneous memories, a memory space in response to a memory allocation request is described in detail below with reference to other drawings.

The memory expander 160 may be implemented by software, hardware, or a combination thereof. In some embodiments, the memory expander 160 may be implemented by software on an operating system (OS) or a lower level than the OS. The memory expander 160 may be implemented by programs loadable to a memory included in an electronic system and executed by at least one processor of the electronic system.

Figure 2A:
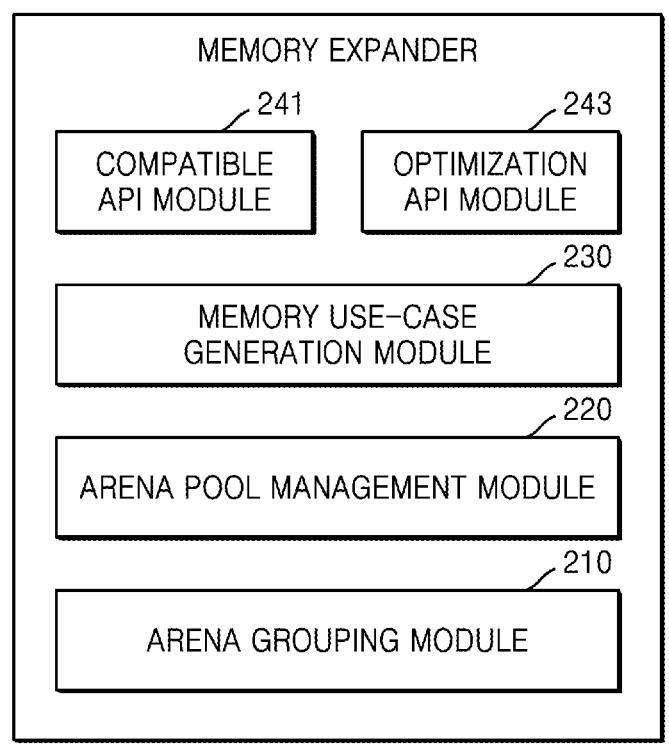
FIGS. 2A and 2B are block diagrams illustrating a memory expander according to some embodiments.
Figure 2B:
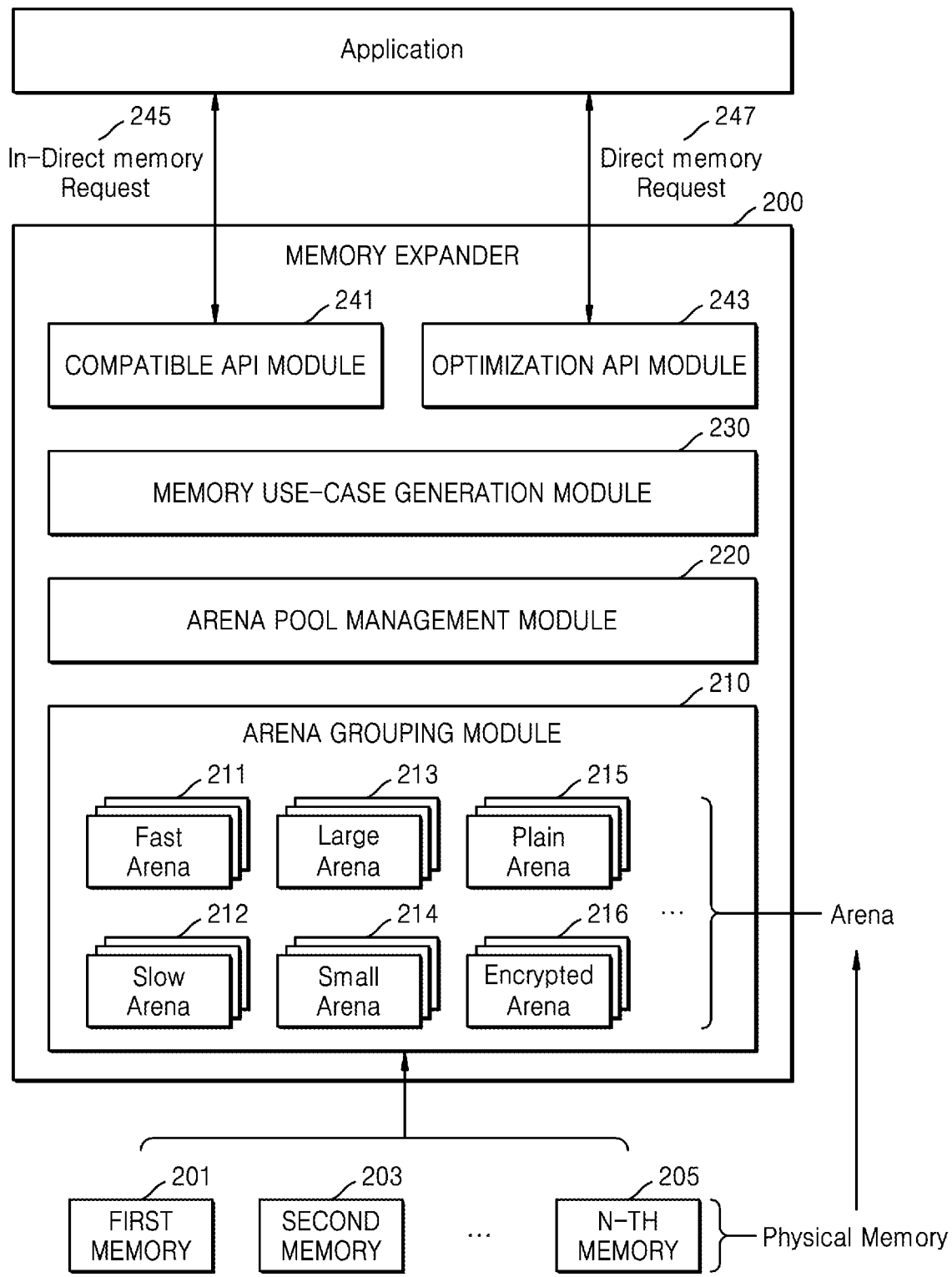

FIGS. 2A and 2B are block diagrams illustrating a memory expander 200 according to some embodiments.

In detail, FIG. 2A illustrates components of the memory expander 200, according to some embodiments. FIG. 2B illustrates the flow data of the memory expander 200, according to some embodiments. Here, the memory expander 200 shown in FIGS. 2A and 2B may correspond to the memory expander 160 described with reference to FIG. 1.

Referring to FIG. 2A, the memory expander 200 may include an arena grouping module 210, an arena pool management module 220, a memory use-case generation module 230, a compatible application programming interface (API) module 241, and an optimization API module 243.

An arena (also sometimes called a region or a zone) refers to a logical unit that manages a memory space corresponding to at least one memory grouped according to memory characteristics, and an arena pool refers to a group of arenas. For example, the arena pool and the arena may be based on logical block addressing (LBA). A plurality of arena pools and arenas included in each arena pool may be stored as a lookup table (LUT).

Arenas included in one arena pool may have the same physical characteristics as each other. For example, physical characteristics of a memory may include the size, speed, and power consumption of the memory and whether the memory is encryptable. At this time, the arena grouping module 210 may generate arenas by grouping heterogeneous memories such that lock contention does not occur between the arenas. Here, lock contention refers to an event in which one process or thread attempts to acquire a lock held by another process or thread.

The arena grouping module 210 may generate a plurality of arena pools by grouping heterogeneous memories by their physical characteristics. In other words, the arena grouping module 210 may reconfigure the heterogeneous memories into arenas according to the physical characteristics thereof.

When heterogeneous memories are grouped by their physical characteristics, isolation between heterogeneous memories (e.g., prevention of latency fluctuation) and aggregation of the same physical characteristics (e.g., bandwidth aggregation) may be achieved such that memories having different physical characteristics are not mixedly used in one arena.

Referring to FIG. 2B, the arena grouping module 210 may group N memories including first to N-th memories 201 to 205 by their physical characteristics and may generate a plurality of arena pools including a fast arena pool 211, a slow arena pool 212, a large arena pool 213, a small arena pool 214, a plain arena pool 215, and an encrypted arena pool 216.

Here, the fast arena pool 211 and the slow arena pool 212 may be generated by grouping memories by speed, the large arena pool 213 and the small arena pool 214 may be generated by grouping memories by size, and the plain arena pool 215 and the encrypted arena pool 216 may be generated by grouping memories according to whether each memory is encryptable. In some embodiments, the physical characteristics of a memory, including the size, speed, and the like of the memory, which are criteria for grouping, may be preset by a user and are not limited to the speed and size of the memory and whether the memory is encryptable.

In some embodiments, the arena grouping module 210 may determine the number of arena pools based on the number of cores in a system (e.g., per CPU). In some embodiments, the number of arena pools may be preset by a user.

The arena pool management module 220 may manage arenas and arena pools. The arena pool management module 220 may manage arenas and arena pools, based on memory use-cases generated by the memory use-case generation module 230, which is described below. For example, the arena pool management module 220 may manage arenas and arena pools to optimally allocate a memory space, while considering a memory request pattern (e.g., a required chunk size) of an upper application layer, available operation resources (e.g., the number of available CPUs) in a system, and physical characteristics (e.g., bandwidth, density, and the like) of a memory.

In some embodiments, the arena pool management module 220 may return a memory space based on a memory use-case. A method of returning, performed by the arena pool management module 220, a memory space based on a memory use-case is described in detail below with reference to other drawings.

The arena pool management module 220 may store arena pools generated by the arena grouping module 210 and may manage the arena pools such that a user may reconfigure heterogeneous memories into various arena pools (e.g., zones, nodes, etc.).

The memory use-case generation module 230 may generate various memory use-cases.

In some embodiments, the memory use-case generation module 230 may select an arena based on a context included in a memory allocation request.

Here, the context may refer to information about characteristics of a memory space to be requested. For example, the context may include a priority placed on the kind of memory, a required space of the memory, the speed of the memory, a maximum memory policy, and a required function of the memory. The function of a memory may include whether data is encryptable and whether power consumption is high or low. An example of the context is described in detail with reference to FIG. 3 below.

The memory expander 200 may include the compatible API module 241 and the optimization API module 243.

The compatible API module 241 may support an API that performs memory allocation with respect to heterogeneous memories without changing an application layer. In other words, a compatible API is a path allowing heterogeneous memories to be used without changing and modifying existing applications and services. The memory expander 200 may exchange an in-direct memory request 245 and a response with the application layer through the compatible API module 241.

The optimization API module 243 may support an API that optimizes memory allocation with respect to heterogeneous memories by directly changing an application layer. In other words, an optimization API is a path for achieving a high level of optimization for the use of heterogeneous memories by directly changing and modifying existing application and services. The memory expander 200 may exchange a direct memory request 247 and a response with the application layer through the optimization API module 243.

The compatible API module 241 and the optimization API module 243 are described in detail below with reference to other drawings.

Figure 3:
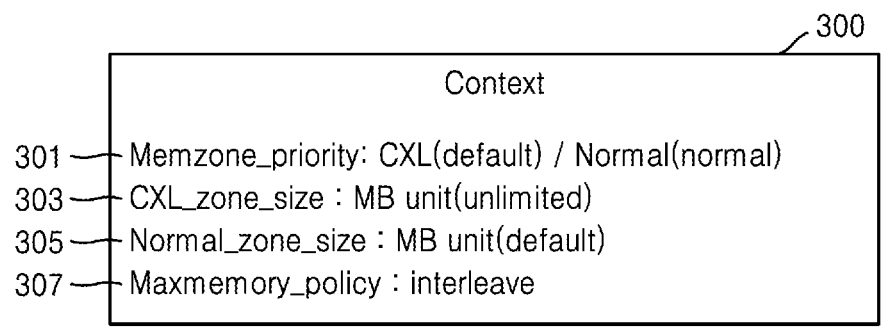
FIG. 3 is a block diagram of a context according to some embodiments.

FIG. 3 is a block diagram of a context 300 according to some embodiments.

Here, it is assumed that arenas are grouped into a CXL arena and a normal arena. At this time, the normal arena may correspond to a logical unit that manages the space of a memory having different physical characteristics than a CXL memory.

Referring to FIG. 3, the context 300 may include information about a memory zone priority (Memzone_priority) 301, a requested CXL memory space (CXL zone size) 303, a requested normal zone memory space (Normal zone size) 305, and a maximum memory policy (Maxmemory_policy) 307.

The Memzone_priority 301 may indicate which of the CXL arena and the normal arena is allocated first. Referring to FIG. 3, it may be seen that the memory expander 200 allocates a memory space of the CXL arena first by default. In other words, the memory expander 200 may allocate a memory space corresponding to a memory allocation request, in order of priority of memory zone through an arena that is a logical unit.

The CXL zone size 303 and the Normal zone size 305 may respectively refer to required memory spaces respectively in the CXL arena and the normal arena. Referring to FIG. 3, it may be seen that unlimited memory space is requested with respect to the CXL arena.

The Maxmemory_policy 307 may refer to a policy on how to allocate a memory space when a requested memory space is greater than an available memory space of an arena. Referring to FIG. 3, it may be seen that the Maxmemory_policy 307 is set to "interleave", which is described below. A maximum memory policy is described in detail with reference to FIG. 4.

Figure 4:
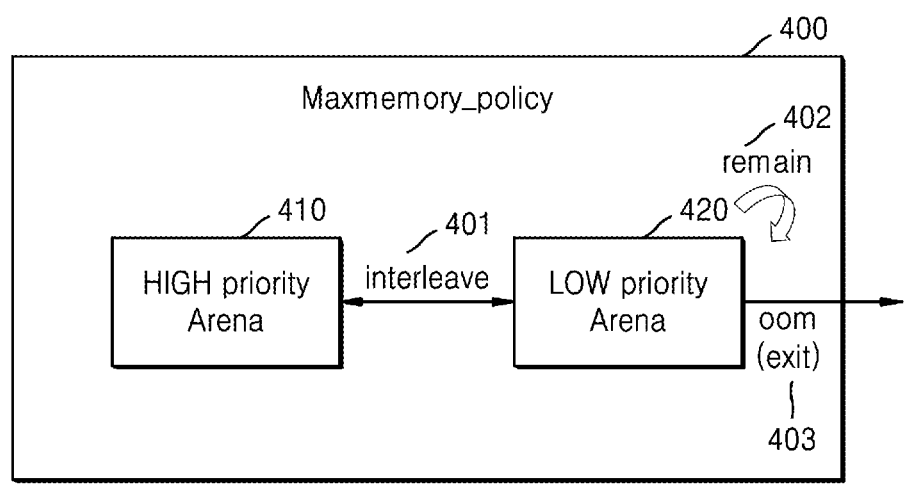
FIG. 4 is a block diagram illustrating a maximum memory policy according to some embodiments.

FIG. 4 is a block diagram illustrating a maximum memory policy according to some embodiments.

Referring to FIG. 4, a high priority arena 410 and a low priority arena 420 are illustrated. Here, a maximum memory policy may include interleave 401, remain 402, and out of memory (oom) 403.

The interleave 401 may refer to a policy of allocating a memory space, which is being used in the high priority arena 410, for a memory space corresponding to a memory allocation request, when a requested memory space is greater than an available memory space of the low priority arena 420.

The remain 402 may refer to a policy of allocating a memory space, which is being used in the low priority arena 420, for a memory space corresponding to a memory allocation request, when a requested memory space is greater than an available memory space of the low priority arena 420.

The out of memory 403 may refer to a policy of allocating only an available memory space of the low priority arena 420 and not performing allocation with respect to an excessive memory space of a requested memory space when a requested memory space is greater than the available memory space of the low priority arena 420.

Referring back to FIGS. 2A and 2B, the memory use-case generation module 230 may select an arena based on the locality of data corresponding to a memory allocation request.

Here, the locality of data may include a time locality and a spatial locality. The time locality may refer to the property that an accessed memory space is likely to be accessed again in the near future, and the spatial locality may refer to the property that a memory space near an accessed memory space is likely to be accessed. A method of selecting, performed by the memory use-case generation module 230, an arena based on the locality of data corresponding to a memory allocation request is described in detail below with reference to FIG. 5.

Figure 5:
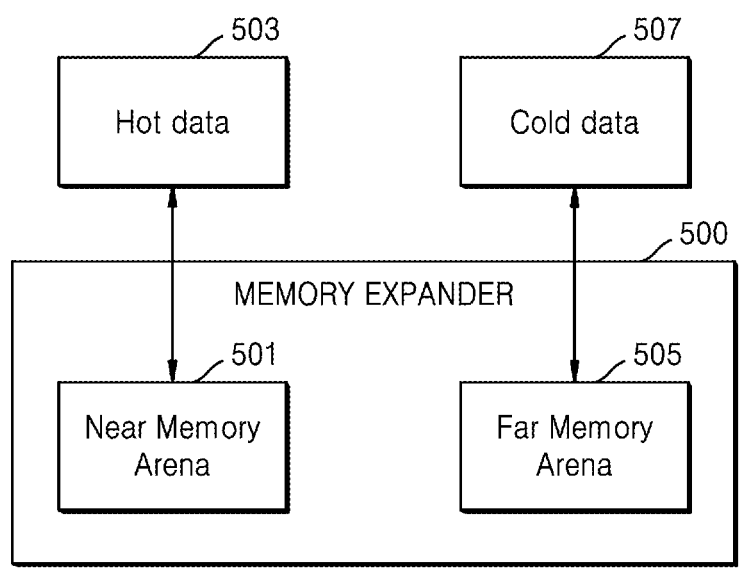
FIG. 5 is a block diagram illustrating a memory expander according to some embodiments.

FIG. 5 is a block diagram illustrating a memory expander 500 according to some embodiments.

Here, the memory expander 500 of FIG. 5 may correspond to the memory expander 160 described with reference to FIG. 1 and the memory expander 200 illustrated in FIGS. 2A and 2B.

Referring to FIG. 5, a near memory arena 501 and a far memory arena 505 are illustrated. Here, the near memory arena 501 and the far memory arena 505 may be generated by grouping, by the arena grouping module 210, heterogeneous memories by speed. The near memory arena 501 may have small and fast memory characteristics, and the far memory arena 505 may have large and slow memory characteristics.

Referring to FIG. 5, there are hot data 503 and cold data 507. Here, the hot data 503 may have a higher time or spatial locality than a preset value, and the cold data 507 may have a lower time or spatial locality than the preset value.

The memory expander 500 (or the memory use-case generation module 230) may generate a memory use-case with respect to an arena, based on the locality of data corresponding to a memory allocation request.

Referring to FIG. 5, the memory expander 500 (or the memory use-case generation module 230) may generate a memory use-case such that a memory space of the near memory arena 501 may be allocated for a memory space corresponding to a memory allocation request corresponding to the hot data 503, and a memory space of the far memory arena 505 may be allocated for a memory space corresponding to a memory allocation request corresponding to the cold data 507.

In some embodiments, each of the memory expanders 160, 200, and 500 may select an arena based on a context included in a memory allocation request and the locality of data corresponding to the memory allocation request. For example, to generate a memory use-case, the memory use-case generation module 230 may consider both a context and the locality of data. In other words, each of the memory expanders 160, 200, and 500 may generate a memory use-case with respect to at least one arena, based on a context included in a memory allocation request and the locality of data corresponding to the memory allocation request.

Referring back to FIGS. 2A and 2B, the memory expander 200 may include the compatible API module 241 and the optimization API module 243.

The compatible API module 241 may support an API that performs memory allocation with respect to heterogeneous memories without changing an application layer. In other words, a compatible API is a path allowing heterogeneous memories to be used without changing and modifying existing applications and services.

The optimization API module 243 may support an API that optimizes memory allocation with respect to heterogeneous memories by directly changing an application layer. In other words, an optimization API is a path for achieving a high level of optimization for the use of heterogeneous memories by directly changing and modifying existing application and services.

In some embodiments, the memory expander 200 may use the compatible API module 241 or the optimization API module 243 to be connected to an application layer.

Referring to FIG. 2B, it may be seen that the memory expander 200 exchanges the in-direct memory request 245 and a response with the application layer through the compatible API module 241. At this time, the in-direct memory request 245 may refer to a request to allocate a memory space of heterogeneous memories without changing or modifying existing applications and services in light of the application layer. For example, the compatible API module 241 may operate to preempt and preprocess a standard call stack, which accesses memory during execution of an application, and adjust a target memory.

Referring to FIG. 2B, it may be seen that the memory expander 200 exchanges the direct memory request 247 and a response with the application layer through the optimization API module 243. At this time, the direct memory request 247 may refer to a request to change or modify existing applications and services in light of the application layer and allocate a memory space of heterogeneous memories. For example, the optimization API module 243 may operate based on a proprietary function based on a physical memory.

Figure 6:
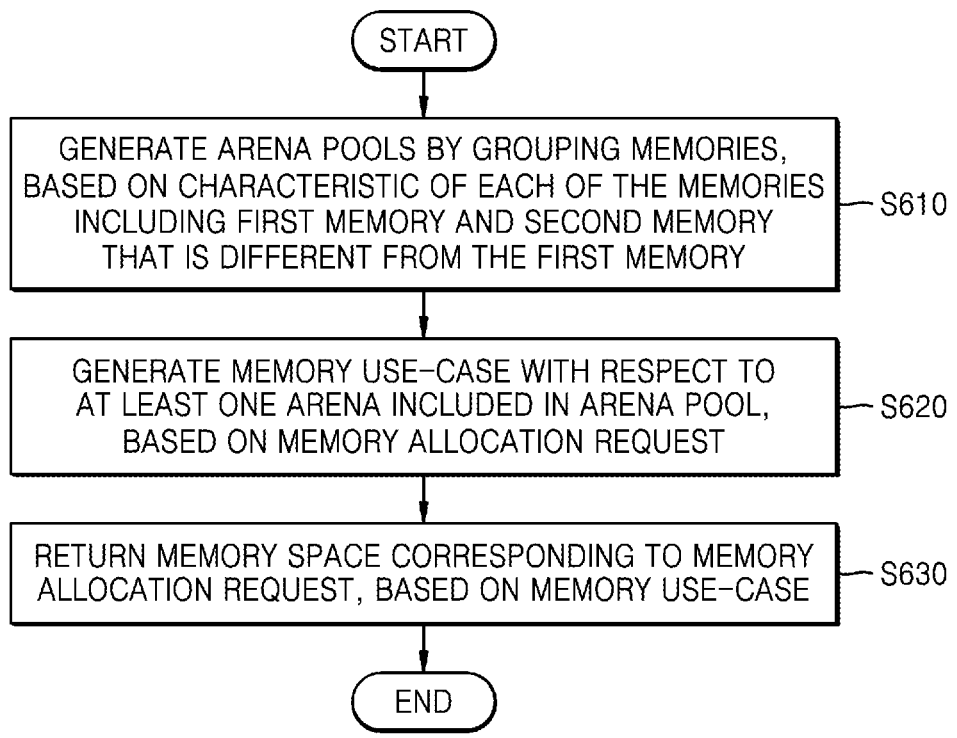
FIG. 6 is a flowchart of a method of allocating a memory space, according to some embodiments.

FIG. 6 is a flowchart of a method of allocating a memory space, according to some embodiments.

Referring to FIG. 6, a plurality of arena pools may be generated by grouping a plurality of memories, based on a characteristic of each of the memories, which include a first memory and a second memory that is different from the first memory, in operation S610. To obtain a characteristic of each of the memories, the method of allocating a memory space may include receiving information about the characteristic of each memory.

In some embodiments, the physical characteristic of a memory may include the size or speed of the memory, whether the memory is encryptable, or power consumption of the memory.

In some embodiments, operation S610 may include determining the number of arena pools based on the number of cores.

Referring to FIG. 6, a memory use-case with respect to at least one arena included in the arena pools may be generated based on a memory allocation request in operation S620.

In some embodiments, the memory expander 200 (or the memory use-case generation module 230) described with reference to FIGS. 2A and 2B may generate a memory use-case with respect to at least one arena, based on a context included in the memory allocation request and the locality of data corresponding to the memory allocation request.

In some embodiments, the context may include a priority placed on the kind of memory, a required memory space, and a maximum memory policy.

In some embodiments, operation S620 may include generating the memory use-case such that a requested memory space is compared with an available memory space of an arena, which has a low priority between two arenas, based on a maximum memory policy, and a memory space corresponding to the memory allocation request is allocated.

In some embodiments, when a memory space (e.g., a thread cache) already allocated to a caller may be allocated to a memory space corresponding to the memory allocation request of the caller, operation S620 may include allocating a portion of the already allocated memory space to the memory space corresponding to the memory allocation request. At this time, the caller refers to a subject (e.g., a device) requesting a memory space.

Referring to FIG. 6, a memory space corresponding to the memory allocation request may be returned based on the memory use-case in operation S630. For example, returning a memory space may include returning (or transmitting) an address of a memory space corresponding to the memory allocation request, based on the memory use-case.

In some embodiments, a method of allocating a memory space may include receiving a memory allocation request, allocating a memory space corresponding to the memory allocation request, based on existence or non-existence of an already allocated free memory chunk in an arena included in an arena pool, and returning the allocated memory space. The allocating of the memory space may include allocating a memory space of a first arena to the memory space corresponding to the memory allocation request when there is an already allocated free memory chunk in the first arena included in the selected arena pool and allocating a memory space of a second arena included in the selected arena pool to the memory space corresponding to the memory allocation request when there is no already allocated free memory chunk in the first arena included in the selected arena pool.

In some embodiments, in a method of allocating a memory space, the compatible API module 241 or the optimization API module 243 may be used for connection to an application layer. The compatible API module 241 may perform memory allocation with respect to heterogeneous memories without changing the application layer. The optimization API module 243 may optimize memory allocation with respect to heterogeneous memories by directly changing the application layer.

Figure 7:
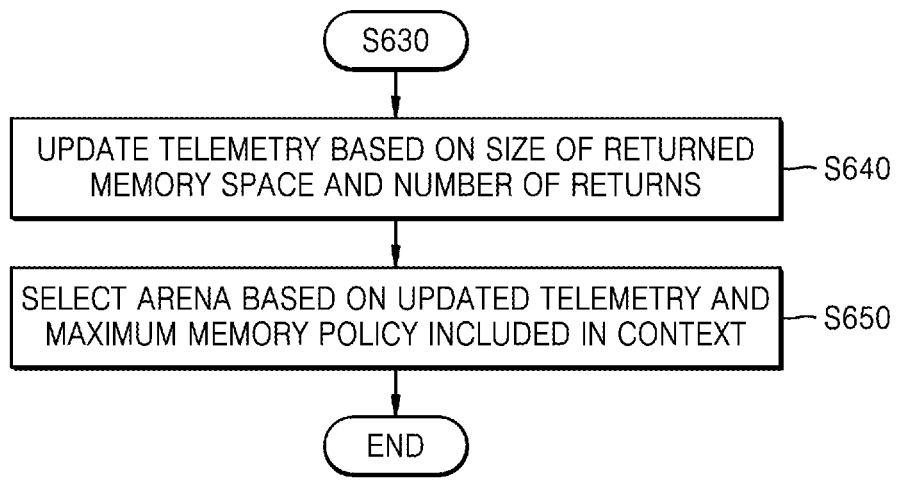
FIG. 7 is a flowchart of a method of allocating a memory space, according to some embodiments.

FIG. 7 is a flowchart of a method of allocating a memory space, according to some embodiments.

Referring to FIG. 7, after operation S630, telemetry may be updated based on the size of the returned memory space and the number of returns in operation S640. Here, the telemetry refers to a statistical parameter that counts the size of the returned memory space and the number of returns.

Referring to FIG. 7, an arena for returning the memory space corresponding to the memory allocation request may be selected based on the updated telemetry and the maximum memory policy included in the context in operation S650. For example, an arena for the memory space that was returned may be selected based on the telemetry that was updated and the maximum memory policy included in the context.

When an available memory space of one arena is less than a requested memory space, another arena for returning the memory space corresponding to the memory allocation request may be additionally selected based on the updated telemetry and the maximum memory policy included in the context. In some embodiments, the additionally selected arena may be determined in advance when the memory use-case is generated in operation S620.

In other words, when a requested memory space is greater than an available memory space in one arena, an additionally selected arena may perform returning of a memory space corresponding to a memory allocation request.

Figure 8:
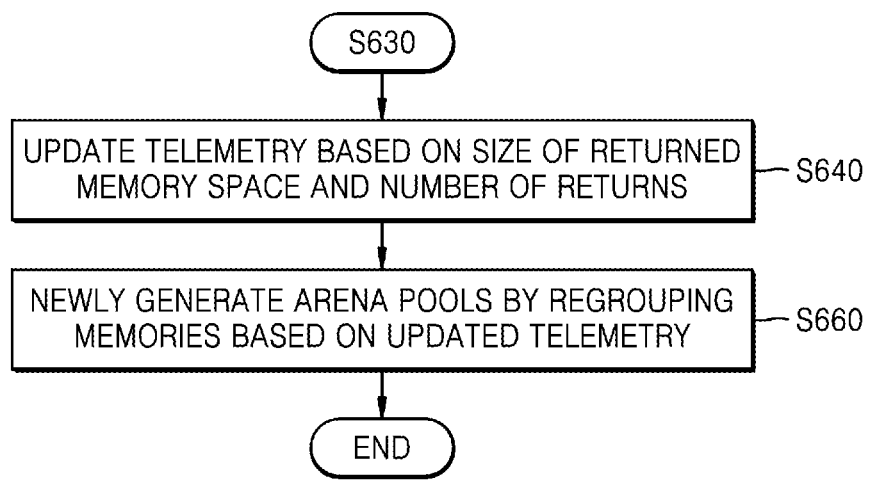
FIG. 8 is a flowchart of a method of allocating a memory space, according to some embodiments.

FIG. 8 is a flowchart of a method of allocating a memory space, according to some embodiments.

Referring to FIG. 8, after operation S630, telemetry may be updated based on the size of the returned memory space and the number of returns in operation S640, as described above. Here, the telemetry refers to a statistical parameter that counts the size of the returned memory space and the number of returns. In some embodiments, the priority placed on the kind of memory included in the context may be changed based on the updated telemetry.

A plurality of arena pools may be newly generated by regrouping the memories based on the updated telemetry in operation S660. In some embodiments, each of the memory expanders 160, 200, and 500 may newly generate a plurality of arena pools by regrouping a plurality of memories based on a user input. In some embodiments, a plurality of arena pools may be newly generated by regrouping the memories based on the changed priority.

Figure 9:
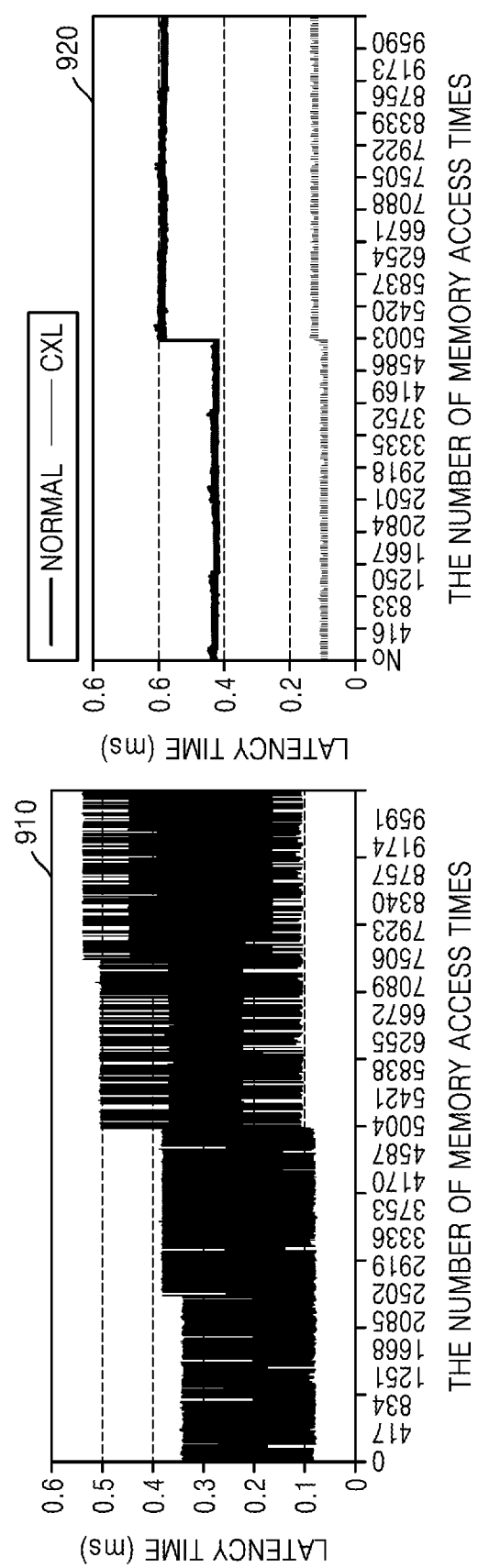
FIG. 9 illustrates the results of evaluating the performance of a method of allocating a memory space, according to some embodiments.

FIG. 9 illustrates the results of evaluating the performance of a method of allocating a memory space, according to some embodiments.

In detail, FIG. 9 shows a result 910 of configuring physical memories, DDRS and CXL memories, which have different latency characteristics from each other, in a single logical memory region (i.e., a single zone) and measuring a latency time with respect to the number of memory access times and a result 920 of configuring physical memories, DDRS and CXL memories, in respective separate logical memory regions (i.e., separate zones) and measuring a latency time with respect to the number of memory access times.

The result 910 of measuring a latency time with respect to the number of memory access times in the configuration having the physical memories, the DDRS and CXL memories, having different latency characteristics from each other, in a single zone shows that latency is not uniform with respect to the numbers of memory access times. It appears that the standard deviation of the latency is at least 0.2 ms.

Contrarily, the result 920 of measuring a latency time with respect to the number of memory access times in the configuration respectively having the physical memories, the DDRS and CXL memories, having different latency characteristics from each other, in the separate zones shows that latency is uniform with respect to the numbers of memory access times. In other words, when the DDR and CXL memories for the linear address space of an arena accessed by an application layer are isolated from each other thread-by-thread, latency may be uniform. This means that arenas are separated by latency and a high level of latency quality of service (QoS) may be secured for an application layer. When CXL memory and DRAM are not grouped by a memory characteristic (e.g., a physical characteristic), latency fluctuation may be unavoidable.

FIG. 10 illustrates the results of evaluating the performance of a method of allocating a memory space, according to some embodiments.

In detail, FIG. 10 shows results of measuring gain (IMDB throughput) when four use cases, UX1, UX2, UX3, and UX4, are planned, each of applications A and B operates as a network server-client model, and a set and get operation is performed on key-value data between a client and a server.

UX1 is a use case in which not DRAM but CXL memory is used in an application server, and intends to check the performance difference between DRAM and CXL memory. Assuming that CXL memory may be developed at a lower cost than DRAM, the total cost may be reduced by using low-cost CXL memory instead of DRAM if CXL memory exhibits ideally equivalent application performance to DRAM.

UX2 is a use case in which more memory is used in an application server by adding CXL memory to DRAM and intends to check performance gain. When DRAM and CXL memory are together used, performance gain in a user application/service may be provided.

UX3 is a use case in which an application server stores data not in storage but in CXL memory and intends to check performance gain. In the case where data is stored in storage because of memory shortage rather than permanent storage, better application performance may be achieved when CXL memory is used.

UX4 is a use case in which an application server is not scaled out but scaled up and intends to check performance gain. Usual disaggregation architecture, in which server systems are scaled out because of memory shortage, is inefficient because it requires additional costs for a CPU, storage, a network, power, space, or the like in addition to actually necessary memory. Accordingly, better application performance may be achieved via scale-up using CXL memory.

Figure 11:
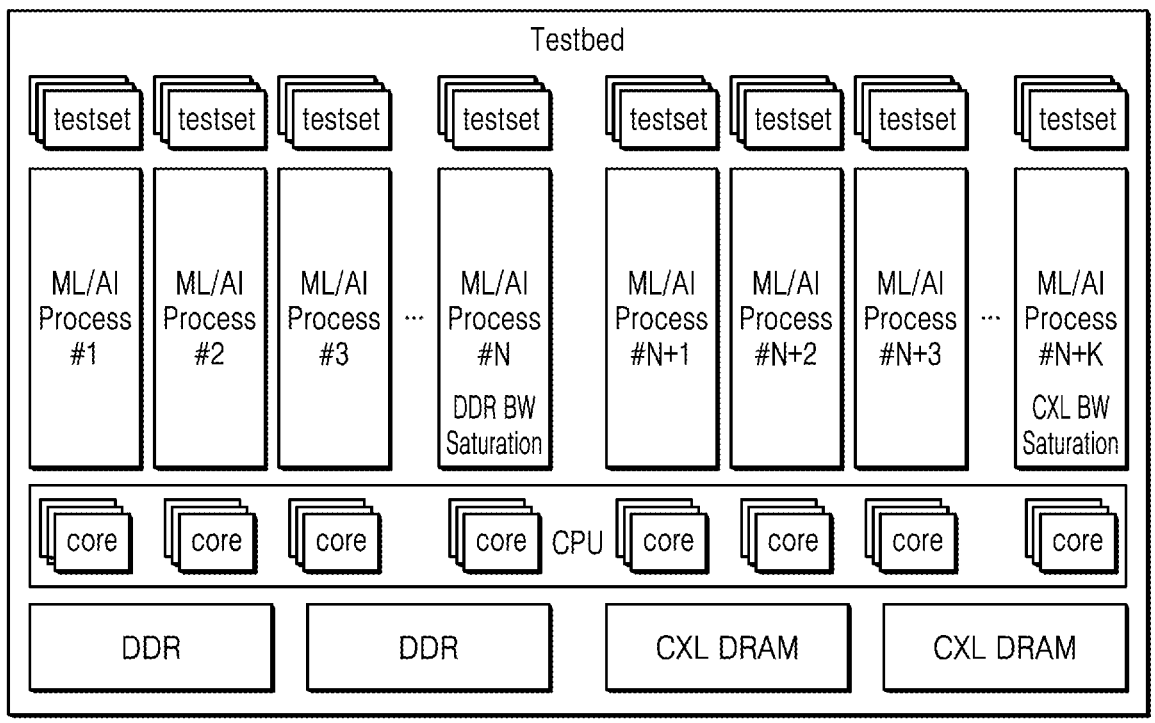
FIG. 11 illustrates the results of evaluating the performance of a method of allocating a memory space, according to some embodiments.
Figure 11:
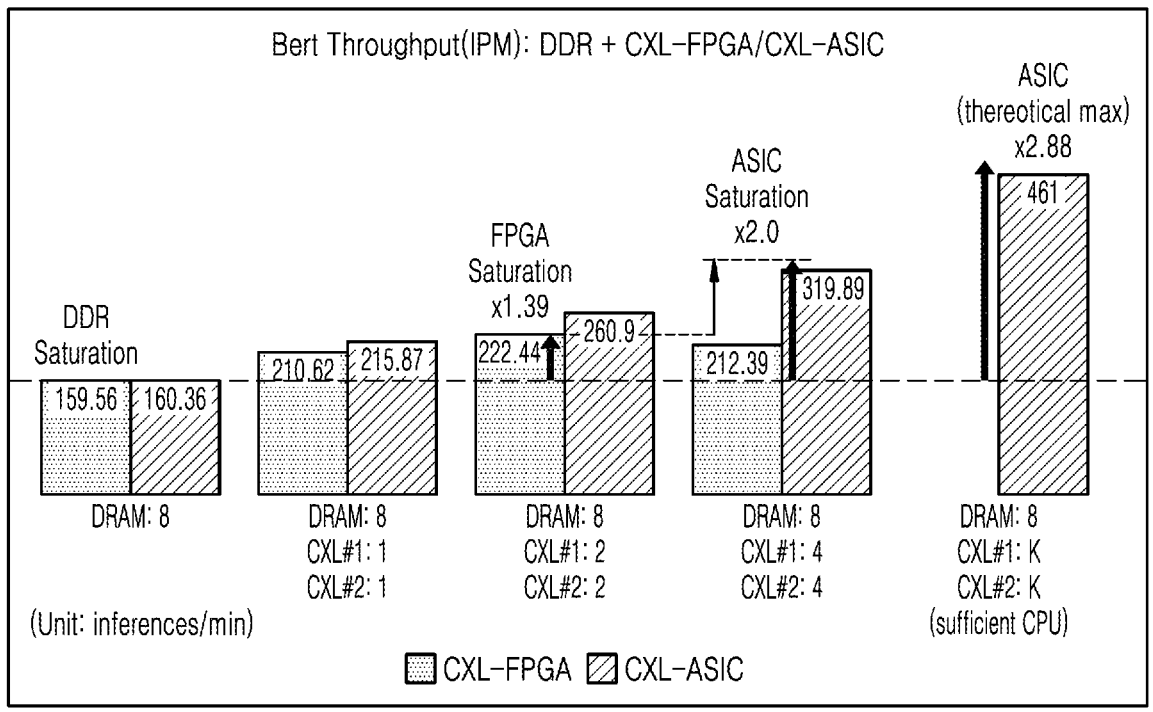

FIG. 11 illustrates the results of evaluating the performance of a method of allocating a memory space, according to some embodiments.

In detail, FIG. 11 shows the results of measuring gain by performing a machine learning (ML) or artificial intelligence (AI) (ML/AI) application, based on a method of allocating a memory space, according to some embodiments.

Referring to the upper part of FIG. 11, when a system includes only DDR nodes, overall application performance (inferences per minute (IPM)) saturates in an N-th ML/AI process. Here, CXL nodes were added to the system, and the application performance of the system was measured.

Referring to the lower part of FIG. 11, it may be seen that the overall application performance was improved in ML/AI processes according to the number of CXL nodes.

Figure 12:
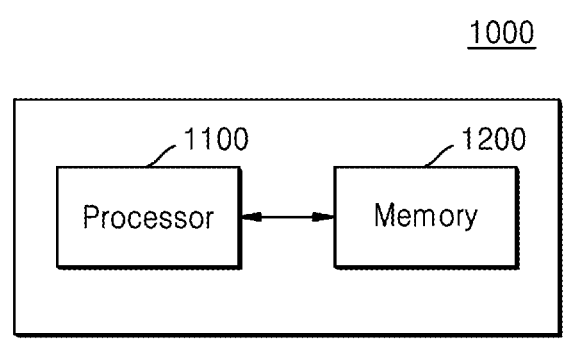
FIG. 12 is a block diagram of a computing device according to some embodiments.

FIG. 12 is a block diagram of a computing device according to some embodiments.

Referring to FIG. 12, a computing device 1000 may include a processor 1100 and a memory 1200. Although only one processor 1100 is illustrated in FIG. 12, embodiments are not limited thereto. The computing device 1000 may include a plurality of processors. In some embodiments, each of the memory expanders 160, 200, and 500 may be implemented through the computing device 1000.

The processor 1100 may include at least one core (not shown) and a GPU (not shown) and/or a connection path (e.g., a bus), which transmits signals between components.

The processor 1100 may perform a method of allocating a memory space, which has been described with reference to FIGS. 1 to 11 above. For example, the processor 1100 may generate a plurality of arena pools by grouping a plurality of memories, which include a first memory and a second memory that is different from the first memory, based on a physical characteristic of each of the memories, may generate a memory use-case with respect to at least one arena included in the arena pools, based on a memory allocation request, and may return a memory space corresponding to the memory allocation request, based on the memory use-case. Here, an arena refers to a logical unit that manages a memory space corresponding to at least one memory grouped according to a physical characteristic of the memory, and an arena pool refers to a group of arenas.

The processor 1100 may further include random access memory (RAM) and read-only memory (ROM) (not shown), which temporarily and/or permanently store signals (or data) internally processed by the processor 1100. The processor 1100 may be implemented as a SoC including at least one selected from the group consisting of a GPU, RAM, and/or ROM.

The memory 1200 may store programs (or one or more instructions) for the processing and controlling operations of the processor 1100. For example, the memory 1200 may include a plurality of modules, by which the method of allocating a memory space described above with reference to FIGS. 6 to 8 is implemented. The memory 1200 may store instructions for enabling the processor 1100 to perform a method of allocating a memory space. For example, the memory 1200 may be configured to store instructions for enabling the processor 1100 to perform operations for allocating a memory space. When instructions stored in the memory 1200 are executed by the processor 1100, the processor 1100 may be configured to perform operations for allocating a memory space.

Figure 13:
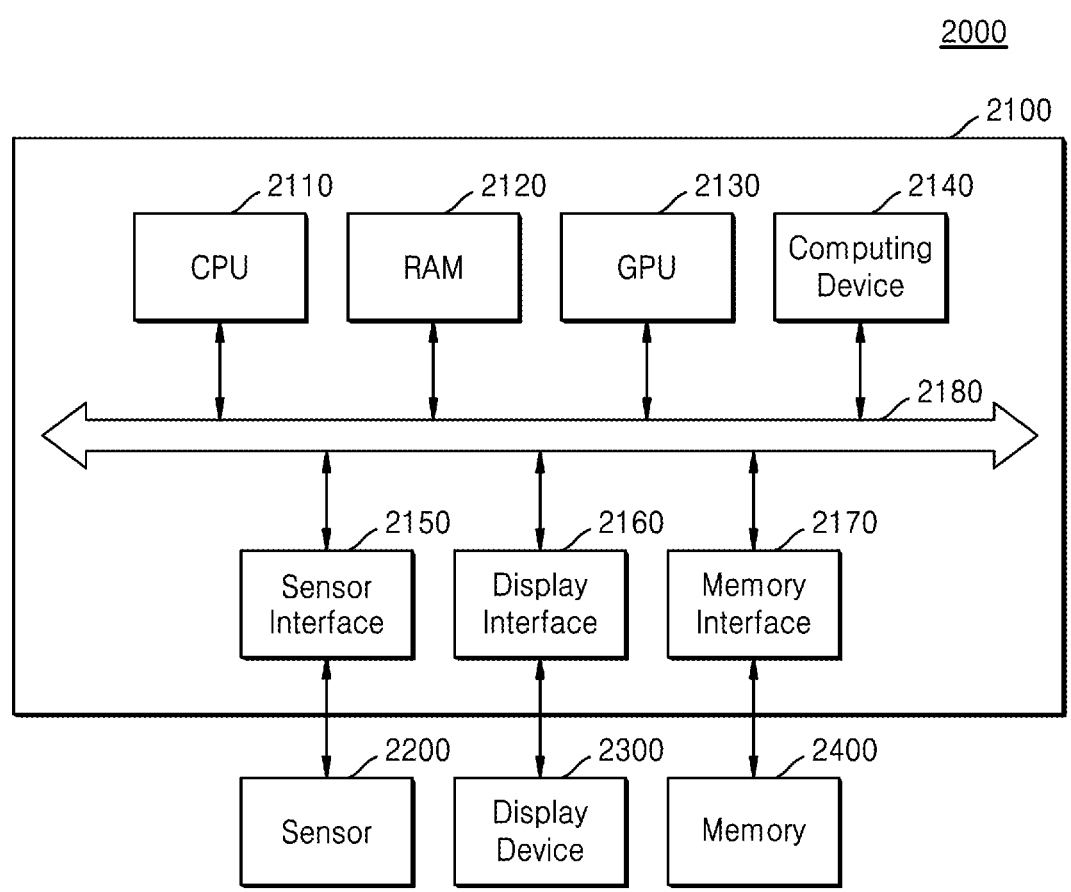
FIG. 13 is a block diagram of a device including an integrated circuit according to some embodiments.

FIG. 13 is a block diagram of a device including an integrated circuit according to some embodiments.

A device 2000 may include an integrated circuit 2100 and components, e.g., a sensor 2200, a display device 2300, and a memory 2400, which are connected to the integrated circuit 2100. For example, the device 2000 may include a mobile device, such as a smartphone, a game console, an advanced driver assistance system (ADAS), or a wearable device, or a data server.

According to some example embodiments, the integrated circuit 2100 may include a CPU 2110, RAM 2120, a GPU 2130, a computing device 2140, a sensor interface 2150, a display interface 2160, and a memory interface 2170. Besides those above, the integrated circuit 2100 may further include general-purpose components, such as a communication module, a digital signal processor (DSP), and a video module. Components (e.g., the CPU 2110, the RAM 2120, the GPU 2130, the computing device 2140, the sensor interface 2150, the display interface 2160, and the memory interface 2170) of the integrated circuit 2100 may exchange data with each other through a bus 2180. In some embodiments, the integrated circuit 2100 may correspond to an application processor. In some embodiments, the integrated circuit 2100 may be implemented as a SoC.

The CPU 2110 may generally control operations of the integrated circuit 2100. The CPU 2110 may include a single core or multiple cores. The CPU 2110 may process or execute programs and/or data, which are stored in the memory 2400. In some embodiments, the CPU 2110 may perform a method of allocating a memory space, according to embodiments, by executing the programs stored in the memory 2400.

The RAM 2120 may temporarily store programs, data, and/or instructions. In some embodiments, the RAM 2120 may include DRAM or static RAM (SRAM). The RAM 2120 may temporarily store data, e.g., image data, which is input or output through interfaces, e.g., the sensor interface 2150 and the display interface 2160, or generated by the GPU 2130 or the CPU 2110.

In some embodiments, the integrated circuit 2100 may further include ROM. The ROM may store programs and/or data, which are continuously used. The ROM may include erasable programmable ROM (EPROM) or electrically erasable programmable ROM (EEPROM).

The GPU 2130 may perform image processing on image data. For example, the GPU 2130 may perform image processing on image data that is received through the sensor interface 2150. The image data processed by the GPU 2130 may be stored in the memory 2400 or provided to the display device 2300 through the display interface 2160.

The sensor interface 2150 may receive data (e.g., image data, audio data, etc.) from the sensor 2200 connected to the integrated circuit 2100.

The display interface 2160 may output data (e.g., an image) to the display device 2300. The display device 2300 may output image data or video data through a display, such as a liquid crystal display (LCD) or an active matrix organic light-emitting diode (AMOLED) display.

The memory interface 2170 may interface with data input from the memory 2400 outside the integrated circuit 2100 or data output to the memory 2400. According to some embodiments, the memory 2400 may include volatile memory, such as DRAM or SRAM, or non-volatile memory, such as resistive RAM (ReRAM), phase-change RAM (PRAM), or NAND flash memory. The memory 2400 may include a memory card, such as a multimedia card (MMC), an embedded MMC (eMMC), a secure digital (SD) card, or a micro-SD card.

As used herein, the terms "comprises", "comprising", "includes", "including", "has", "having" and any other variations thereof specify the presence of the stated features, integers, steps, operations, elements, and/or components, but do not preclude the presence or addition of one or more other features, integers, steps, operations, elements, components, and/or groups thereof.

While the inventive concept has been particularly shown and described with reference to example embodiments thereof, it will be understood that various changes in form and details may be made therein without departing from the scope of the following claims.

What is claimed is:

1. A method of allocating a memory space, the method comprising:
    generating a plurality of arena pools by logically grouping a plurality of memories based on a physical characteristic of each of the plurality of memories, the plurality of memories including a first memory and a second memory that has a different physical characteristic from the first memory;
    generating a memory use-case with respect to at least one arena included in the plurality of arena pools, based on a memory allocation request;
    returning a memory space corresponding to the memory allocation request, based on the memory use-case, wherein the returning of the memory space comprises transmitting an address of the memory space;
    updating telemetry based on a size of the memory space and a number of returns; and
    newly generating the plurality of arena pools by regrouping the plurality of memories, based on the telemetry,
    wherein the telemetry comprises a statistical parameter that counts the size of the memory space and the number of returns,
    wherein the at least one arena comprises a logical unit that is configured to manage a memory space corresponding to at least one memory from the plurality of memories grouped according to the physical characteristic, and
    wherein each of the plurality of arena pools comprises a group of arenas.

2. The method of claim 1, further comprising receiving information about the physical characteristic of each of the plurality of memories, wherein the physical characteristic includes at least one of size of each of the plurality of memories, speed of each of the plurality of memories, power consumption of each of the plurality of memories, or whether each of the plurality of memories is encryptable.

3. The method of claim 1, wherein the generating of the memory use-case includes selecting the at least one arena based on a context included in the memory allocation request and a locality of data corresponding to the memory allocation request, and
    the locality of data includes one of a time locality or a spatial locality.

4. The method of claim 3, wherein the context includes a memory, a required memory space, a maximum memory policy, and a priority placed on a kind of memory.

5. The method of claim 4, further comprising:
    selecting an arena for the memory space that was returned, based on the telemetry and the maximum memory policy included in the context.

6. The method of claim 1, wherein the method is performed using at least one of a compatible application programming interface (API) or an optimization API,
    the compatible API is configured to perform memory allocation with respect to heterogeneous memories without changing an application layer, and
    the optimization API is configured to optimize the memory allocation with respect to the heterogeneous memories by changing the application layer.

7. The method of claim 1, wherein the generating of the plurality of arena pools by logically grouping the plurality of memories includes determining a number of arena pools based on a number of cores, and
    the plurality of arena pools are based on logical block addressing (LBA).

8. The method of claim 1, further comprising allocating the memory space corresponding to the memory allocation request in the at least one arena, based on an existence or a non-existence of an already allocated free memory chunk in the at least one arena,
    wherein the generating of the memory use-case includes comparing a requested memory space in the memory allocation request with an available memory space of the at least one arena.

9. A memory expander comprising:
    at least one processor;
    a compatible application programming interface (API) module and an optimization API module, each connected to an application layer; and
    a memory that is configured to store instructions that, when executed by the at least one processor, causes the at least one processor to perform operations for allocating a memory space, the operations comprising:
    generating a plurality of arena pools by logically grouping a plurality of memories based on a physical characteristic of each of the plurality of memories, the plurality of memories including a first memory and a second memory that is different from the first memory;
    generating a memory use-case with respect to at least one arena included in the plurality of arena pools, based on a memory allocation request; and
    returning a memory space corresponding to the memory allocation request, based on the memory use-case,
    wherein the at least one arena comprises a logical unit that is configured to manage a memory space corresponding to at least one memory from the plurality of memories grouped according to the physical characteristic,
    wherein each of the plurality of arena pools comprises a group of arenas,
    wherein the compatible API module is configured to perform memory allocation with respect to heterogeneous memories without changing the application layer, and wherein the optimization API module is configured to optimize the memory allocation with respect to the heterogeneous memories by changing the application layer.

10. The memory expander of claim 9, wherein the physical characteristic includes at least one of size of each of the plurality of memories, speed of each of the plurality of memories, power consumption of each of the plurality of memories, or whether each of the plurality of memories is encryptable.

11. The memory expander of claim 9, wherein the generating of the memory use-case includes selecting the at least one arena based on a context included in the memory allocation request and a locality of data corresponding to the memory allocation request, and
the locality of data includes one of a time locality or a spatial locality.

12. The memory expander of claim 11, wherein the context includes a required memory space, a maximum memory policy, and a priority placed on a kind of memory.

13. The memory expander of claim 12, wherein the operations further comprise:
updating telemetry based on a size of the memory space that was returned and a number of returns; and
selecting an arena for the memory space that was returned, based on the telemetry that was updated and the maximum memory policy included in the context,
wherein the telemetry comprises a statistical parameter that counts the size of the memory space that was returned and the number of returns.

14. The memory expander of claim 12, wherein the operations further comprise:
updating telemetry based on a size of the memory space that was returned and a number of returns; and
newly generating a plurality of arena pools by regrouping the plurality of memories, based on the telemetry that was updated,
wherein the telemetry comprises a statistical parameter that counts the size of the memory space that was returned and the number of returns.

15. The memory expander of claim 9, wherein the first memory comprises compute express link (CXL) dynamic random access memory (DRAM), and the second memory comprises double data rate (DDR) memory.

16. A system comprising:
a device connected to a bus and configured to communicate with a first memory;
a host processor configured to select one of a first protocol or a second protocol based on a size of first data to be written to the first memory or read from the first memory, and access the first memory through the bus based on the one of the first protocol or the second protocol that was selected; and
a second memory that is different from the first memory, wherein the first protocol is for memory access,
the second protocol is for non-coherent input/output, and
the host processor is further configured to:
generate a plurality of arena pools by logically grouping a plurality of memories based on a physical characteristic of each of the plurality of memories, the plurality of memories including the first memory and the second memory;
generate a memory use-case with respect to at least one arena included in the plurality of arena pools, based on a memory allocation request; and
return a memory space corresponding to the memory allocation request, based on the memory use-case, by transmitting an address of the memory space,
wherein, to generate the memory use-case, the host processor is further configured to select the at least one arena based on a context included in the memory allocation request and a locality of data corresponding to the memory allocation request,
wherein the locality of data includes a spatial locality,
wherein the at least one arena comprises a logical unit that is configured to manage a memory space corresponding to at least one memory from the plurality of memories grouped according to the physical characteristic,
wherein each of the plurality of arena pools comprises a group of arenas, and
wherein the host processor is further configured to be connected to an application layer through one of a compatible application programming interface (API) or an optimization API,
the compatible API is configured to perform memory allocation with respect to heterogeneous memories without changing the application layer, and
the optimization API is configured to optimize the memory allocation with respect to the heterogeneous memories by changing the application layer.

17. The system of claim 16, wherein the physical characteristic includes at least one of size of each of the plurality of memories, speed of each of the plurality of memories, power consumption of each of the plurality of memories, or whether each of the plurality of memories is encryptable.

18. The system of claim 16, wherein
the locality of data further includes a time locality.

* * * * *